(12) United States Patent
Rieder et al.

(10) Patent No.: US 7,614,309 B2
(45) Date of Patent: Nov. 10, 2009

(54) CUP-SHAPED ULTRASONIC TRANSDUCER FOR A FLOWMETER

(75) Inventors: Alfred Rieder, Landshut (DE); Achim Wiest, Weil am Rhein (DE); Torsten Strunz, London (GB); Michal Bezdek, Freising (DE)

(73) Assignee: Endress & Hauser Flowtec AG, Reinach (CH)

( * ) Notice: Subject to any disclaimer, the term of this patent is extended or adjusted under 35 U.S.C. 154(b) by 0 days.

(21) Appl. No.: 10/580,314

(22) PCT Filed: Nov. 26, 2004

(86) PCT No.: PCT/EP2004/053121

§ 371 (c)(1),
(2), (4) Date: Feb. 12, 2007

(87) PCT Pub. No.: WO2005/052519

PCT Pub. Date: Jun. 9, 2005

(65) Prior Publication Data

US 2008/0034887 A1    Feb. 14, 2008

(30) Foreign Application Priority Data

Nov. 27, 2003    (DE)    ................................. 103 56 114

(51) Int. Cl.
G01F 1/66 (2006.01)
(52) U.S. Cl. .................. 73/861.27; 73/861.29
(58) Field of Classification Search .. 73/861.25–861.31
See application file for complete search history.

(56) References Cited

U.S. PATENT DOCUMENTS

| | | | | |
|---|---|---|---|---|
| 3,771,361 A | * | 11/1973 | Reznick | 73/861.12 |
| 4,601,210 A | * | 7/1986 | Brown | 73/861.27 |
| 4,783,997 A | * | 11/1988 | Lynnworth | 73/861.18 |
| 4,914,959 A | * | 4/1990 | Mylvaganam et al. | 73/861.28 |
| 4,945,276 A | | 7/1990 | Mylvaganam | |
| 5,814,736 A | * | 9/1998 | Loschberger et al. | 73/861.25 |
| 6,142,015 A | * | 11/2000 | Getman et al. | 73/861.27 |
| 6,584,862 B1 | * | 7/2003 | Molenaar | 73/861.27 |
| 6,604,433 B1 | * | 8/2003 | Azuma et al. | 73/861.27 |
| 6,615,674 B2 | * | 9/2003 | Ohnishi | 73/861.27 |

(Continued)

FOREIGN PATENT DOCUMENTS

EP    0 477 575 A1    4/1992

(Continued)

OTHER PUBLICATIONS

English language Abstract of EP 1 315 144.*

*Primary Examiner*—Harshad Patel
*Assistant Examiner*—Punam Patel
(74) *Attorney, Agent, or Firm*—Bacon & Thomas, PLLC

(57) ABSTRACT

In order to be able to couple as great a fraction as possible of ultrasonic measuring signals into a medium to be measured, an ultrasonic sensor is provided with a cup-shape and includes a housing and an oscillatable unit for producing the ultrasonic signals. The oscillatable unit is composed of a plurality of components and is so embodied that it has a node plane, which is oriented essentially perpendicularly to the radiating or receiving direction of the ultrasonic measuring signals. At least a portion of the outer surface of the oscillatable unit is connected with the housing in the region of the node plane of the oscillatable unit.

11 Claims, 2 Drawing Sheets

U.S. PATENT DOCUMENTS 6,788,620 B2 * 9/2004 Shiraishi et al. ............. 367/152
2002/0124662 A1 9/2002 Suzuki

FOREIGN PATENT DOCUMENTS

| EP | 0 749 005 A2 | 12/1996 |
| EP | 1 315 144 A2 | 5/2003 |
| JP | 2003270012 A * | 9/2003 |

* cited by examiner

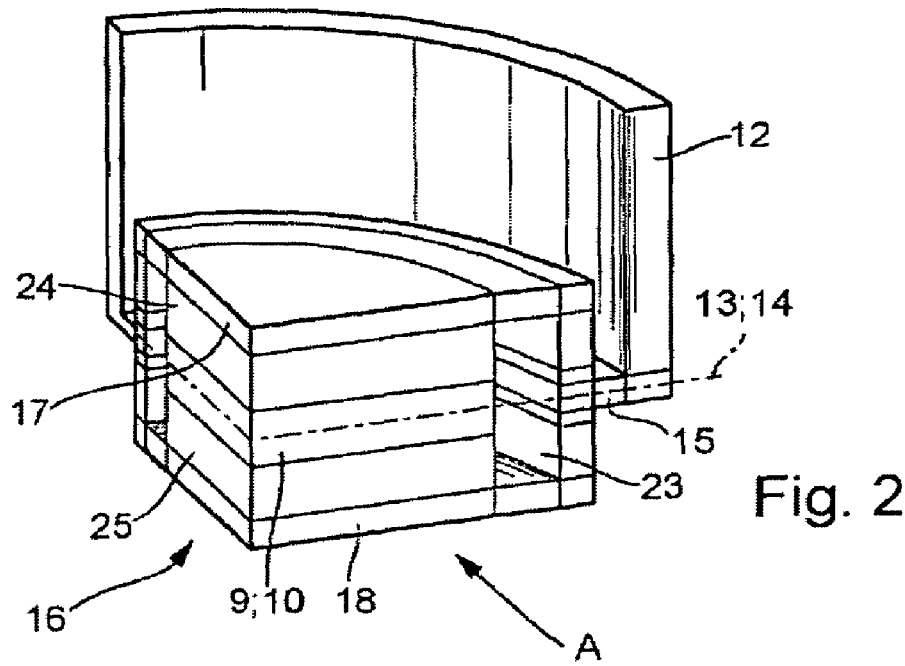
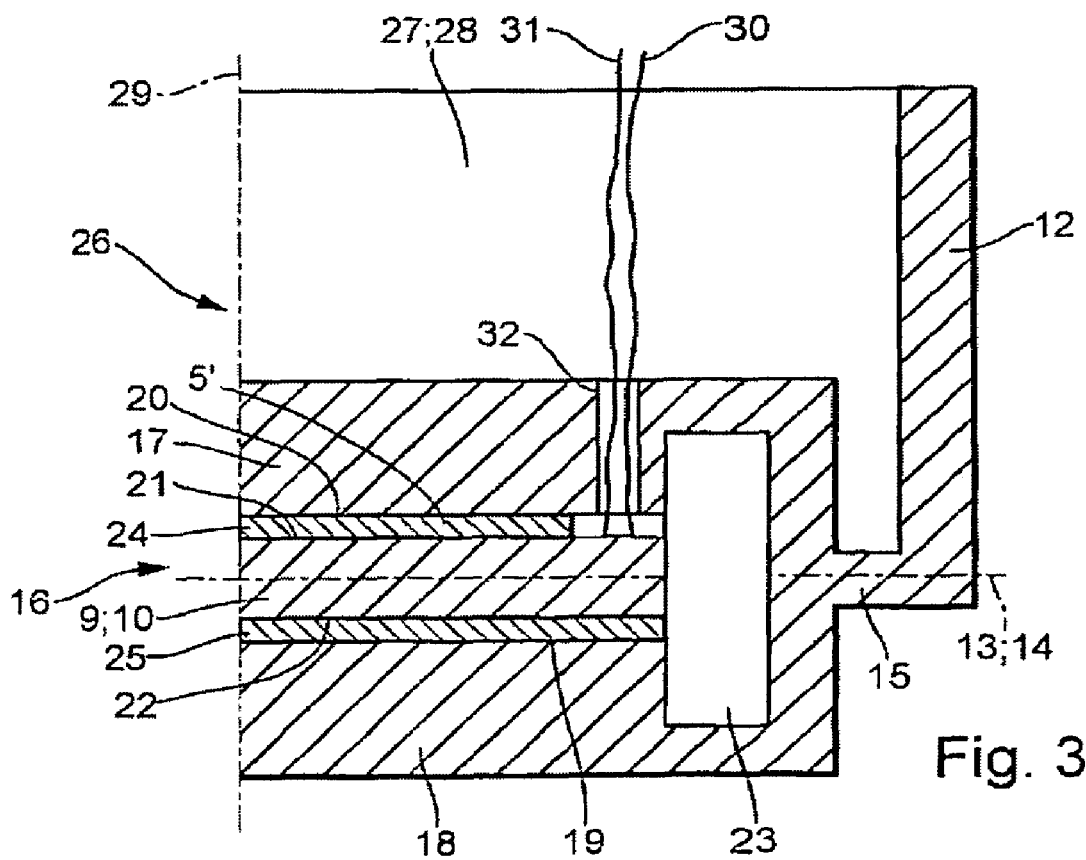

CUP-SHAPED ULTRASONIC TRANSDUCER FOR A FLOWMETER

FIELD OF THE INVENTION

The invention relates to a device for determining and/or monitoring the volume, and/or mass, flow, e.g. flow rate, of a medium to be measured, flowing through a pipeline in a stream direction.

BACKGROUND OF THE INVENTION

Ultrasonic flow measuring devices are used frequently in process and automation technology. They enable a contactless determination of volume, and/or mass, flow of a medium in a pipeline.

Known ultrasonic flow measuring devices work either according to the Doppler principle or according to the travel time difference principle. In the case of the travel time difference principle, the difference in travel times of ultrasonic measuring signals in the stream direction and counter to the stream direction of the medium is evaluated. For this, the ultrasonic measuring signals are alternately emitted from, and received by, the ultrasonic sensors in the stream direction and counter to the stream direction of the medium. From the travel time difference of the ultrasonic measuring signals, the flow velocity can be determined, and, therewith, in the case of known diameter of the pipeline, the volume flow rate, and, in the case of known, or measured, density of the medium, the mass flow rate.

In the case of the Doppler principle, ultrasonic measuring signals of predetermined frequency are coupled into the flowing medium. The ultrasonic measuring signals reflected in the medium are evaluated on the basis of the frequency shift arising between the in-coupled and the reflected ultrasonic measuring signals. Here also, the flow velocity, or the volume, and/or mass, flow rate of the medium can be determined.

Use of flow measuring devices working according to the Doppler principle is only possible when the medium contains air bubbles or impurities, on which the ultrasonic measuring signals can be reflected. Therefore, the use of such ultrasonic flow measuring devices is rather limited in comparison to ultrasonic flow measuring devices working according to the travel time difference principle.

Regarding measuring device types, a distinction is drawn between ultrasonic measurement pickups, which are inserted into the pipeline, and clamp-on flow measuring devices, where the ultrasonic sensors are pressed externally onto the pipeline by means of a clamping mechanism. Clamp-on flow measuring devices are described, for example, in EP 0 686 255 B1, U.S. Pat. No. 4,484,478 or U.S. Pat. No. 4,598,593.

In the case of both types of ultrasonic flow measuring devices, the ultrasonic measuring signals are, at a predetermined angle, radiated into, respectively received from, the pipeline, or measuring tube, as the case may be, in which the flowing medium is located. In order to achieve an optimum impedance matching, the ultrasonic measuring signals are coupled into, respectively out of, the pipeline via a mediating body, e.g. a coupling wedge. The main component of an ultrasonic sensor is at least one piezoelectric element, which produces and/or receives the ultrasonic measuring signals.

Now, an ultrasonic sensor produces, besides the actual wanted-signal serving for determining the volume, and/or mass, flow, also a so called body signal, i.e. a certain fraction of the ultrasonic measuring signal propagates via the wall of the pipeline and superimposes as a disturbance signal on the actual flow-measuring signal. As a counter measure, it has long been a practice to select the sound path through the pipeline, respectively through the medium being measured, to be as long as possible, such that the travel time of the measuring signal crossing the medium clearly differs from the travel time of the signal propagating via the wall of the pipeline. Problems do, however, arise when the pipeline has a small diameter. In this case, it is difficult to avoid errors in the measurement. Consequently, it would be very advantageous to prevent these disturbance signals, which propagate via the tube wall, already at the source and not only later to attempt to filter or eliminate them from the measured signals.

SUMMARY OF THE INVENTION

An object of the invention is to provide an ultrasonic flow measuring device in which the portion of the ultrasonic measuring signals which propagates via the wall of the pipeline is minimized.

The object is achieved according to the invention by the following features: The ultrasonic sensor is provided with a cup-shape and has a housing and an oscillatable unit for producing ultrasonic signals; the oscillatable unit is composed of a plurality of components; the oscillatable unit is so embodied that it exhibits a node plane which is oriented essentially perpendicularly to the radiating or receiving direction of the ultrasonic measuring signals; and at least a portion of the external surface of the oscillatable unit is connected with the housing in the region of the node plane. The node plane is defined herein such that the measuring signals outgoing and incoming in the radiating or receiving direction destructively interfere with one another. By the construction of the ultrasonic sensor according to the invention, a higher degree of decoupling of the oscillatable unit from the housing is achieved.

Since, according to the invention, at least a portion of the external surface of the oscillatable unit is connected with the housing in the region of the node plane of the oscillatable unit, in this way, an energy introduced into the wall of the pipeline via the housing of the ultrasonic sensor is minimized. Naturally, the structure of the invention also assures that no sound waves are transferred from the environment of the ultrasonic flow measuring device into the ultrasonic sensor. It enables, thus, also the suppression of external, disturbing variables. In terms of a characterizing name, the ultrasonic sensor of the invention can be termed a 'balanced ultrasonic sensor' or a 'balanced sensor cup'.

According to a preferred embodiment of the apparatus of the invention, the node plane is a plane of symmetry of the oscillatable unit; the oscillatable unit is thus symmetrically constructed with respect to the node plane. Furthermore, an annular membrane, or diaphragm, is provided in the region of the node plane, or the plane of symmetry, of the oscillatable unit, via which the oscillatable unit is connected with a housing. As already mentioned, this embodiment achieves an excellent sound decoupling between the oscillatable unit of the ultrasonic sensor and the environment. Moreover, the membrane isolates the interior of the housing from the process; it serves thus to protect the ultrasonic sensor against foreign matter from the environment or from the process, as the case may be.

According to a preferred embodiment of the device of the invention, the oscillatable unit has at least one disc-shaped piezoelectric element, a roof element and a floor element, with the piezoelectric element, or the piezoelectric elements, being arranged symmetrically about the plane of symmetry and with the roof element and the floor element being arranged symmetrically on both sides of the piezoelectric element, or piezoelectric elements, as the case may be.

Especially in the case of use of a piezoelectric element, the piezoelectric element has first and second delimiting surfaces, with the floor element being arranged at the first delimiting surface and the roof element being arranged at the second delimiting surface.

Furthermore, an advantageous embodiment of the invention provides electrodes in a predetermined region of the two delimiting surfaces of the piezoelectric element, via which electrodes the piezoelectric element, or the oscillatable unit, is excited to oscillate.

Additionally, between the electrode on the first delimiting surface and the floor element and the electrode on the second delimiting surface and the roof element, there is provided in each case a dielectric insulating layer. The dielectric insulating layer is, for instance, a ceramic.

According to an advantageous further development of the device of the invention, a ring shaped chamber is provided in an edge region of the oscillatable unit. Preferably, the chamber is air filled. In principle, the chamber fulfills two responsibilities. On the one hand, it is helpful in the manufacture of the ultrasonic sensor of the invention; on the other hand, it provides in the installation of the ultrasonic sensor room for a certain amount of play and thus enables accommodation of possibly arising radial oscillations of the oscillatable unit.

A preferred further development of the device of the invention provides a potting compound in a housing chamber located above the roof element. For example, the potting compound is a silicone compound.

In a very interesting embodiment of the device of the invention, the oscillatable unit is so constructed that it is adaptable to different media to be measured. In principle, this embodiment can be implemented in different ways. In one alternative, the roof element is exchangeable, with roof elements of various thicknesses and/or densities being provided, which are selectable as a function of the particular medium to be measured.

A further alternative provides that fill media of different densities are used which are arrangeable in the housing chamber above the roof element as a function of the particular medium to be measured. By means of the previously described embodiments, it is possible to take into consideration, and to compensate for, the influence of the medium being measured on the balanced sensor cup. Of course, in these cases, the node plane can be expected to deviate from the position of the symmetry plane of the oscillatable unit.

BRIEF DESCRIPTION OF THE DRAWINGS

The invention will now be explained in greater detail on the basis of the appended drawings, the figures of which show as follows:

FIG. 2 a perspective view of a part of the ultrasonic sensor of the invention; and FIG. 3 an elevational view of the ultrasonic sensor shown in FIG. 2 taken according to the arrow A of FIG. 2.

DESCRIPTION OF THE PREFERRED EMBODIMENTS

Figure 1:
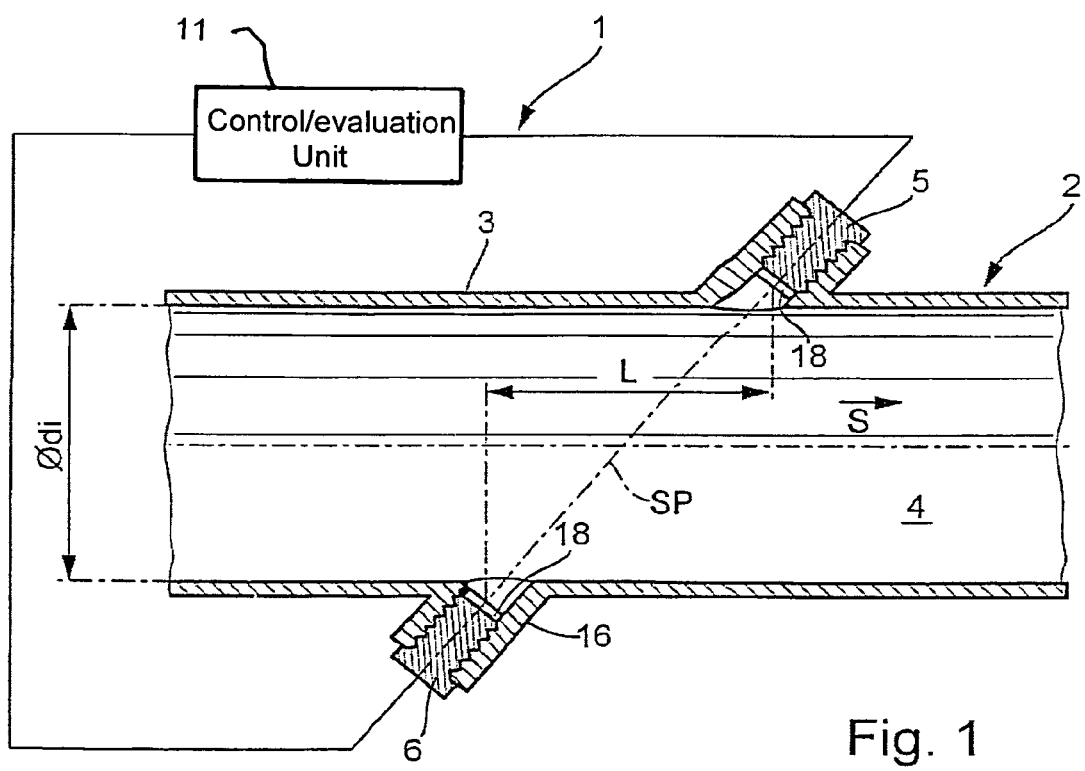
FIG. 1 a schematic drawing of an embodiment of an ultrasonic flow measuring device in which the ultrasonic sensor of the invention is employed.

The device includes, generally, at least one ultrasonic sensor, which emits, and receives, ultrasonic measuring signals into, and out of, the pipeline; and a control/evaluation unit, which determines the volume, and/or mass, flow of the medium in the pipeline on the basis of the travel time difference of the ultrasonic measuring signals in the stream direction and counter to the stream direction, or on the basis of the Doppler shift of the ultrasonic measuring signals.

FIG. 1 is a schematic drawing of an inline, ultrasonic, flow-measuring device 1, in which the ultrasonic sensor 5, 6 of the invention is used. In the illustrated case, the ultrasonic flow measuring device 1 determines volume, and/or mass, flow of the medium to be measured using the known travel-time-difference method.

Essential components of the inline ultrasonic flow measuring device 1 are the two ultrasonic sensors 5, 6 and the control/evaluation unit 11. The two ultrasonic sensors 5, 6 are applied to the pipe 2, spaced from one another by a distance L, by means of a securement apparatus not specially shown in FIG. 1. Suitable securement apparatuses are well known in the state of the art and are sold by the assignee. The pipeline 2 has a predetermined inner diameter di. The medium 4 flows through the pipeline 2 in the stream direction S.

An ultrasonic sensor 5, 6 includes as an essential component at least one piezoelectric element 9, 10, i.e. an oscillatable unit 16, where the ultrasonic measuring signals are produced and/or received. The ultrasonic measuring signals are in each case coupled into, or coupled out of, the pipeline 2 through which the medium flows. A floor element 18 is, in known manner, so embodied that a best possible impedance matching can be achieved in the transition from one medium into the other. SP in the drawing indicates the sound path, on which the ultrasonic measuring signals propagate in the pipeline 2 and in the medium 4. In the illustrated case, a so-called single-traverse arrangement of the ultrasonic sensors 5, 6 is shown. One traverse is that portion of a sound path SP in which an ultrasonic measuring signal crosses the pipeline 2 once. The traverses can, depending on the arrangement of the ultrasonic sensors 5, 6, and, as required, introduction of a reflector element into the sound path SP, run diametrally or chordally.

FIG. 2 shows a perspective view of a portion of an ultrasonic sensor 5, 6 of the invention. FIG. 3 is an elevational view of the same, looking toward the ultrasonic sensor 5, 6 in FIG. 2 in the direction of the arrow A. The ultrasonic sensor 5, 6 has, with the exception of the bore 32 for the electric connection lines, a rotationally symmetric construction with reference to the axis 29 of symmetry. Essential components of the ultrasonic sensor 5, 6 of the invention are the housing 12 and the oscillatable unit 16. The oscillatable unit 16 is so embodied that it exhibits a node plane 13 arranged essentially perpendicularly to the radiating or receiving direction of the ultrasonic measuring signals. At least a portion of the external surface of the oscillatable unit 16 is connected with the housing 12 in the region of the node plane 13 of the oscillatable unit 16. The node plane 13 is defined in such a manner that there, the outgoing and incoming measuring signals in the radiating or receiving direction destructively interfere with one another. The connection between the oscillatable unit 16 and the housing 12 is accomplished via the membrane, or diaphragm, 15. By the construction of the ultrasonic sensor 5, 6 according to the invention, the oscillatable unit 16 is, as already explained above, largely decoupled from the housing 12. In this way, energy introduced by way of the housing of the ultrasonic sensor 5, 6 into the wall 3 of the pipeline is minimized. Additionally, it is prevented that sound energy from the exterior is introduced into the oscillatable unit.

Basic building blocks of the oscillatable unit 16 are the disc-shaped piezoelectric element 9, 10, the roof element 17 and the floor element 18. The piezoelectric element 9, 10 is arranged symmetrically to the plane 14 of symmetry. The roof element 17 and the floor element 18 are placed symmetrically on both sides of the piezoelectric element 9, 10. In an edge region of the roof element 17 and floor element 18 there is located a chamber 23.

The piezoelectric element has a first delimiting surface 19 and a second delimiting surface 20, with the floor element being arranged at the first delimiting surface 19 and the roof element 17 being arranged at the second delimiting surface 20.

In a predetermined region of the two delimiting surfaces 19, 20 of the piezoelectric element 9, 10, electrodes 21, 22 are applied, via which the piezoelectric element 9, 10 is excited to oscillate. Additionally, provided between the electrode 22 on the first delimiting surface 19 and the floor element 18 and the electrode 21 on the second delimiting surface 20 and the roof element 17 is in each case a dielectric insulating layer 24, 25. The dielectric insulating layers 24, 25 are, for instance, ceramic.

The housing chamber 26 above the roof element 17 is filled with a potting compound 27. Especially, the potting compound 27 is a silicone compound.

An optimum matching of the ultrasonic sensors 5, 6 of the invention to different media 4 to be measured can be achieved by slight modifications of the oscillatable unit 16. In principle, different paths can be followed here. According to one alternative, the roof element 17 is exchangeable, with roof elements 17 of different thicknesses and/or different densities being provided, which are exchangeable as a function of the particular medium 4 to be measured. A further alternative provides that fill media 28 of different densities are used which are arrangeable in the housing chamber 26 above the roof element 17 as a function of the particular medium 4 to be measured. By means of the above described embodiments, it is possible to take into consideration, and to compensate for, the influence of the medium 4 to be measured on the balanced sensor cup. Of course, in these cases, the node plane 13 can be expected to deviate from the position of the plane 14 of symmetry of the oscillatable unit 16.

The invention claimed is:

1. A device for determining and/or monitoring volume, and/or mass, flow of a medium to be measured, flowing through a pipeline in a stream direction (S), comprising:
   at least one ultrasonic sensor, for radiating ultrasonic measuring signals into, and receiving ultrasonic measuring signals from, the pipeline;
   a control/evaluation unit, which determines volume, and/or mass, flow of a medium being measured in the pipeline on the basis of the travel time difference of the ultrasonic measuring signals in, and counter to, the stream direction (S) or on the basis of the Doppler shift of the ultrasonic measuring signals, said at least one ultrasonic sensor has a cup-shape and includes a housing and an oscillatable unit for producing the ultrasonic signals; and
   a ring-shaped membrane, or diaphragm, provided in the region of a node plane or a plane of symmetry of said oscillatable unit, via which membrane, or diaphragm, said oscillatable unit is connected with said housing, wherein:
   said oscillatable unit is composed of a plurality of components and is so embodied that the node plane is arranged essentially perpendicularly to the radiating or receiving direction of the ultrasonic measuring signals;
   at least a portion of an outer surface of said oscillatable unit is connected with said housing in the region of the node plane of said oscillatable unit, and
   the node plane is the plane of symmetry of said oscillatable unit.

2. The device as claimed in claim 1, wherein:
said oscillatable unit includes at least one disc-shaped piezoelectric element or elements, a roof element and a floor element;
said piezoelectric element, or elements, is/are arranged symmetrically to the plane of symmetry; and
said roof element and the floor element are arranged symmetrically on both sides of said piezoelectric element, or elements.

3. The device as claimed in claim 2, wherein:
said piezoelectric element has a first delimiting surface and a second delimiting surface;
said floor element is provided parallel to said first delimiting surface; and
said roof element is provided parallel to said second delimiting surface.

4. The device as claimed in claim 3, wherein:
in a predetermined region of said two delimiting surfaces, electrodes are provided, via which said piezoelectric element or elements, respectively said oscillatable unit, is excited to oscillate.

5. The device as claimed in claim 4, wherein:
between said electrode on said first delimiting surface and said floor element and said electrode on said second delimiting surface and said roof element, in each case, a dielectric insulating layer is provided.

6. The device as claimed in claim 3, wherein:
said roof element is exchangeable; and
said roof element is selected from a group of roof elements of different thicknesses and/or different densities, which are exchangeable as a function of the particular medium to be measured and which are intergratable into said oscillatable unit.

7. The device as claimed in claim 2, wherein:
in an edge region of said oscillatable unit, a ring-shaped chamber is provided.

8. The device as claimed in claim 2, further comprises:
a housing chamber located above said roof element, wherein:
a potting compound is provided in said housing chamber.

9. The device as claimed in claim 8, wherein:
the potting compound is a silicone potting compound.

10. The device as claimed in claim 8, wherein:
exchangeable fill media of different densities are provided, which are arrangeable in said housing chamber above said roof element as a function of the particular medium to be measured.

11. The device as claimed in claim 1, wherein:
said oscillatable unit is so embodied that it is adaptable to different media to be measured.

* * * * *

UNITED STATES PATENT AND TRADEMARK OFFICE
CERTIFICATE OF CORRECTION

PATENT NO. : 7,614,309 B2  Page 1 of 1
APPLICATION NO. : 10/580314
DATED : November 10, 2009
INVENTOR(S) : Rieder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 153 days.

Signed and Sealed this

Nineteenth Day of October, 2010

David J. Kappos
*Director of the United States Patent and Trademark Office*